United States Patent
Nishimura et al.

(10) Patent No.: US 6,596,407 B2
(45) Date of Patent: Jul. 22, 2003

(54) COATED POLYESTER FILM

(75) Inventors: Syuichi Nishimura, Shiga (JP); Satoshi Tsukamoto, Shiga (JP); Chikao Morishige, Shiga (JP); Tadashi Okudaira, Shiga (JP); Mutsuo Nishi, Fukui (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 25 days.

(21) Appl. No.: 09/873,383

(22) Filed: Jun. 5, 2001

(65) Prior Publication Data
US 2002/0009607 A1 Jan. 24, 2002

(30) Foreign Application Priority Data
Jun. 5, 2000 (JP) ........................................ 2000-167896

(51) Int. Cl.$^7$ ............................................... B32B 27/36
(52) U.S. Cl. ................. 428/480; 428/423.7; 428/304.4; 428/306.6; 428/308.4; 428/315.5; 428/319.7
(58) Field of Search ............................ 428/423.7, 480, 428/306.6, 308.4, 304.4, 315.5, 319.7

(56) References Cited

U.S. PATENT DOCUMENTS 4,857,396 A    8/1989   Otonari et al.

FOREIGN PATENT DOCUMENTS

| EP | 0 505 861 | 9/1992 | |
|---|---|---|---|
| EP | 0 728 801 | 8/1996 | |
| JP | 62-097890 | 7/1987 | |
| JP | 05-286099 | * 2/1993 | ........... B32B/27/36 |

* cited by examiner

Primary Examiner—James J. Seidleck
Assistant Examiner—Melanie Bissett
(74) Attorney, Agent, or Firm—Morrison & Foerster LLP

(57) ABSTRACT

The present invention provides a coated polyester film consisting of a polyester film having opacity as shown by an optical density of not less than 0.3, and a coating layer formed on at least one surface of this polyester film, wherein a surface of this coating layer shows a 60-degree specular glossiness G1 and a 75-degree specular glossiness G2, that satisfy the following formulas (1) and (2):

$$G1 \leq 20 \qquad (1)$$

$$1 < G2/G1 \leq 4 \qquad (2).$$

6 Claims, No Drawings

COATED POLYESTER FILM

TECHNICAL FIELD OF THE INVENTION

The present invention relates to a coated polyester film superior in ink adhesive property, printability and resistance to falling off of particles from a coating layer, which is particularly preferable as a substrate for labels.

BACKGROUND OF THE INVENTION

Polyester films have been applied to a wide variety of uses because of their high crystallinity and superiority in transparency, gloss, mechanical property and chemical resistance. For imparting functionality, such as printability, blocking resistance, antistatic property and the like, a coating layer is generally formed on the surface of a polyester film. For achieving both the transparency and handling property (blocking resistance, slip property, wear and abrasion resistance and the like), it is a general practice to add particles to a coating layer of a polyester film, thereby to form irregularities on the film surface.

In the seal printing frequently used particularly for label printing and offset printing, however, the roll of a printer slips on the print surface and the like and rubs the film. As a result, the film is scraped and particles of the coating layer fall in a powder from the surface of the coating layer. While the falling off of particles from the coating layer has not been noted heretofore, it leads to the loss of the above-mentioned properties and further to staining of the roll. Moreover, deinking occurs to degrade the product value.

SUMMARY OF THE INVENTION

It is therefore an object of the present invention to solve the above-mentioned problems and provide a coated polyester film superior in resistance to falling off of particles from a coating layer and printability, while maintaining the ink adhesive property.

According to the present invention, it has been found that specifying of the specular glossiness of the surface of the coating layer of a polyester film leads to the production of a coated polyester film having satisfactory ink adhesive property, printability and resistance to falling off of particles from a coating layer.

The object of the present invention can be achieved by the following.

1) A coated polyester film comprising a polyester film having opacity as shown by an optical density of not less than 0.3, and a coating layer formed on at least one surface of said polyester film, wherein a surface of the coating layer shows a 60-degree specular glossiness G1 and a 75-degree specular glossiness G2 that satisfy the following formulas (1) and (2):

$$G1 \leq 20 \quad (1)$$

$$1 < G2/G1 \leq 4 \quad (2)$$

2) The coated polyester film of the aforementioned 1), wherein the polyester film has voids in the film and an apparent density of 0.3–1.3 g/cm$^3$.

3) The coated polyester film of the aforementioned 1), wherein the aforementioned coating layer is made from a composition comprising, as main components, at least one resin selected from polyester, polyurethane, acrylic polymer and copolymers thereof, and one or more kinds of inert particles.

4) The coated polyester film of the aforementioned 1), wherein the aforementioned resin comprises a water-insoluble and water-dispersible polyester resin and a water-soluble polyurethane resin having at least one block isocyanate in a molecule.

5) The coated polyester film of the aforementioned 1), wherein a surface of the aforementioned coating layer has a surface resistivity of not more than $1 \times 10^{13}$ Ω/□.

6) The coated polyester film of the aforementioned 1), wherein the polyester film has voids in the film and wherein a ratio of the number of voids to a film thickness is not less than 0.20 void/$\mu$m.

DETAILED DESCRIPTION OF THE INVENTION

The polyester resin, which is a main component of the polyester film to be used for a substrate in the present invention, comprises a polyester obtained by polycondensation of an aromatic dicarboxylic acid, such as terephthalic acid, isophthalic acid, naphthalenedicarboxylic acid and the like or an ester thereof, and glycol, such as ethylene glycol, diethylene glycol, 1,4-butanediol, 1,6-hexamethylene glycol, neopentyl glycol and the like.

The polyester resin may contain copolymerizable aromatic, aliphatic or alicyclic dicarboxylic acid and aromatic, aliphatic or alicyclic glycol as components.

Such polyester resin can be produced by polycondensation of aromatic dicarboxylic acid and glycol after esterification, polycondensation of aromatic dicarboxylic acid alkyl ester and glycol after transesterification, polycondensation of aromatic dicarboxylic acid diglycol ester, or by other known method.

Examples of the polyester resin include thermoplastic polyester resin such as polyethylene terephthalate, polybutylene terephthalate, polyethylene-2,6-naphthalate, and the like. The polyester may be a homopolymer, or contain a heterologous polyester resin, or a copolymer comprising a third component. In any case, a polyester comprising ethylene terephthalate, butylene terephthalate, ethylene-2,6-naphthalate unit in a proportion of not less than 70 mol %, preferably not less than 80 mol %, more preferably not less than 90 mol %, is preferable. Of these, polyethylene terephthalate is most preferable.

The polyester film to be used in the present invention is particularly preferably a biaxially oriented film from the practical aspect of strength, stiffness and the like.

The polyester film to be used in the present invention may have a monolayer structure or a multilayer structure. The film preferably contains a layer that is partly or entirely non-transparent. The polyester film has an optical density showing the opacity of not less than 0.3, preferably 0.3–4.0, particularly preferably 0.5–3.0. When the optical density is less than 0.3, any printing on the surface of the coated polyester film obtained from such film becomes unpreferably illegible and unclear. When the optical density is not more than 4.0, more superior legibility can be expected.

The optical density within the above-mentioned range can be achieved without particular limitation by any method. For example, it is achieved by adding, to a polyester resin, inorganic particles or a thermoplastic resin incompatible with the polyester resin, without particular limitation on the content thereof. When inorganic particles are added, the content thereof is preferably 5–35 wt %, particularly preferably 8–25 wt %, of the polyester produced. When an incompatible thermoplastic resin is added, its content is preferably 5–35 wt %, particularly preferably 8–28 wt %, of the polyester. When inorganic particles and a thermoplastic resin incompatible with the polyester resin are used in combination, the total amount thereof is preferably not more than 40 wt % of the polyester film, from the aspects of film strength, stiffness and stability during film forming.

While the inorganic particles to be used are not subject to any particular limitation, those having an average particle size of 0.1–4.0 µm, particularly preferably 0.3–1.5 µm, are preferable. The inorganic particles are exemplified by white pigments such as titanium oxide, barium sulfate, calcium carbonate, zinc sulfide and the like, which may be used in combination upon mixing. Furthermore, inorganic particles, such as silica, alumina, talc, kaolin, clay, calcium phosphate, mica, hectorite, zirconia, tungsten oxide, lithium fluoride, calcium fluoride, calcium sulfate and the like, which are generally used for films, may be concurrently used.

While the thermoplastic resin incompatible with a polyester resin is not subject to any particular limitation, polyolefin resin such as polystyrene resin, polyethylene resin, polypropylene resin, polymethylpentene resin and the like, acrylic resin, phenoxy resin, polyphenylene oxide resin, polycarbonate resin and the like can be mixed with a polyethylene terephthalate resin. These thermoplastic resins may be used in a mixture and may be modified. It is needless to say that they can be used concurrently with the above-mentioned inorganic particles. Where necessary, various brighteners may be added.

The polyester film to be used in the present invention is preferably a microporous polyester film having an apparent density of 0.3–1.3 g/cm³.

A microporous polyester film having a ratio of the number of voids therein to the film thickness (hereinafter to be abbreviated as a void ratio) of not less than 0.20 void/µm, preferably not less than 0.25 void/µm, more preferably not less than 0.30 void/µm, is preferable for both the cushioning property and surface peel strength. A coated polyester film obtained from such film is superior in clearness of print and processability during printing. As used herein, the void ratio (void/µm) can be defined by the formula:

void number (voids) in the film thickness direction/film thickness (µm)

The upper limit of the void ratio is preferably 0.80 void/µm, more preferably 0.55 void/µm, in view of the void forming efficiency. The void ratio can be adjusted to fall within the above-mentioned range by changing the amount and the kind of incompatible thermoplastic resin to be added, viscosity thereof and the like. The void ratio can be also adjusted by changing the shape of a screw of an extruder, setting a static mixer in the flow path of molten resin and the like. A different method may be used for this end.

Such microporous polyester film is particularly useful because the opacity can be further improved by scattering of the light that occurs in the interface between fine voids in the film and matrix polyester, which improved opacity in turn reduces the amount of the aforementioned inorganic particles to be added. In addition, the presence of fine voids makes the substrate film itself lightweight, making handling easy and affording a greater economical effect in cutting costs of starting materials and transportation, and the like.

Such microporous polyester film can be obtained by a known method comprising kneading a thermoplastic polyester resin, which is a matrix, with a thermoplastic resin incompatible with the polyester resin, and drawing the obtained sheet, comprising the incompatible resin dispersed in a fine particle state in the polyester resin, at least in a monoaxial direction, thereby forming voids around the aforementioned incompatible resin particulates, or by other method.

The obtained microporous polyester film has a thickness of preferably 5–300 µm. Particularly, a microporous polyester film having a void ratio of not less than 0.20 void/µm preferably has a thickness of 20–300 µm, more preferably 40–250 µm.

The coated polyester film of the present invention essentially has a coating layer formed on at least one surface of a polyester film substrate. This coating layer is preferably an adhesion-improving layer having an ink residual rate by the crosscut method of not less than 90%, according to the evaluation method of the ink adhesive property to be mentioned later.

A coating layer may be formed by applying a coating solution, comprising an adhesion-improving resin composition, to the surface of a polyester film, which is a substrate, or by laminating an adhesion-improving resin on a polyester film, which is a substrate, by coextrusion, or by other method. To improve adhesion between a polyester film, which is a substrate, and a coating layer, moreover, the film may be subjected to a surface treatment in advance. The surface treatment may be, for example, a corona discharge treatment, a plasma discharge treatment, an active energy beam irradiation, such as ultraviolet (UV) irradiation treatment, electron beam (EB) irradiation treatment and the like, a flame treatment, or vapor deposition such as PVD, CVD and the like.

Particularly, a coating layer formed by applying a coating solution, containing an adhesion-improving resin composition, to the surface of a polyester film is most effective in the present invention for adhesion with a print ink layer or other coating materials.

Such coating layer is preferably made from a resin composition containing at least one member selected from polyester, polyurethane, acrylic polymer and copolymers thereof, and one or more kinds of inert particles.

A coating layer made from, of the above-mentioned adhesion-improving resins, an adhesion-improving resin containing a mixture of a water-insoluble and water-dispersible polyester resin, having a sulfone group in a molecule, and a water-soluble polyurethane resin, having at least one block isocyanate in a molecule, is particularly preferable. This is because the layer markedly improves adhesion to a substrate polyester film, as well as to printing ink, such as general ultraviolet (UV)-curable ink, oxidation polymerization type ink and the like.

In this case, the content ratio based on weight of the aforementioned water-insoluble and water-dispersible polyester resin (A) and the water-soluble polyurethane resin (B) is preferably (A)/(B)=90/10-10/90, particularly preferably (A)/(B)=80/20-20/80.

The coated polyester film of the present invention needs to have a 60-degree specular glossiness G1 and a 75-degree specular glossiness G2 of the coating layer surface, which satisfy the following formulas (1) and (2):

$$G1 \leq 20 \tag{1}$$

$$1 < G2/G1 < 4 \tag{2}$$

The 60-degree specular glossiness G1 of the coating layer surface needs to be not more than 20, preferably not more than 18, particularly preferably not more than 15. The ratio G2/G1 of the 75-degree specular glossiness G2 to the 60-degree specular glossiness G1 needs to be over 1 and not more than 4, preferably over 1 and not more than 3.5, particularly preferably over 1 and not more than 3.

When the 60-degree specular glossiness G1 of the coating layer surface exceeds 20, the resistance to falling off of particles from a coating layer becomes insufficient. When the ratio of the 75-degree specular glossiness G2 to the 60-degree specular glossiness G1 of the coating layer surface (G2/G1) is not more than 1, the resistance to falling off of particles becomes insufficient, and the printability is also degraded somewhat. When the G2/G1 exceeds 4, the surface of a coating layer that absorbs ink has less irregularities and shows degraded printability.

For the 60-degree specular glossiness G1 and 75-degree specular glossiness G2 of the coating layer surface to satisfy the aforementioned formulas (1) and (2), the inert particles to be contained in the coating layer are preferably adjusted to have appropriate average particle size, standard deviation of the particle size, shape (particle size ratio, longer diameter/shorter diameter), particle content, thickness of the coating layer and the like.

To be specific, the ratio of the average particle size d ($\mu$m) of the inert particles, to be contained in the coating layer, to the thickness t ($\mu$m) of the coating layer (d/t) is preferably 1.0–5.0, more preferably 1.2–4.0, most preferably 1.5–2.5. When d/t is less than 1.0, sufficient adhesion of ink, paper supply for printing and blocking resistance tend to be unattainable. When the ratio exceeds 5.0, the particles may fall off from the coating layer of the coated polyester film during printing and cause powder fall. The aforementioned d and t can be determined on a photograph observed with an electron microscope.

The thickness t of the coating layer is preferably 0.01–5.0 $\mu$m, more preferably 0.05–1.5 $\mu$m, particularly preferably 0.1–1.0 $\mu$m. When the thickness of the coating layer is less than 0.01 $\mu$m, the adhesion to the substrate polyester film is not sufficient, and the particles cannot be sufficiently fixed in the coating layer, resulting in falling off of particles from the coating layer. Conversely, when it exceeds 5.0 $\mu$m, the particles are embedded in the resin of the coating layer, and the surface irregularities and blocking resistance, indispensable for the handling property of the coated polyester film, may not be attained.

The inert particles to be contained in the coating layer may be inorganic particles such as titanium oxide, barium sulfate, calcium carbonate, calcium sulfate, silica, alumina, talc, kaolin, clay, calcium phosphate, mica, hectorite, zirconia, tungsten oxide, lithium fluoride, calcium fluoride and the like, organic polymer particles such as polystyrene, polyacrylic, melamine, benzoguanamine, silicone resin and the like, and the like. These may be used in combination.

The inert particles in the aforementioned coating layer preferably have an average particle size d of 0.04–1.5 $\mu$m, more preferably 0.06–1.0 $\mu$m, particularly preferably 0.1–0.8 $\mu$m. When they have an average particle size of less than 0.04 $\mu$m, the surface of a coated polyester film has insufficient irregularities, which renders the ink adhesive property insufficient. When the average particle size exceeds 1.5 $\mu$m, the particles may come off the coating layer of the coated polyester film and cause powder fall.

Of the aforementioned particles, inert particles having a particle size ratio (longer diameter/shorter diameter) of 1.0–1.5, and the standard deviation of particle size of not more than 1.0 are preferable from the aspect of resistance to falling off of particles from a coating layer. The inert particles having a particle size ratio (longer diameter/shorter diameter) of 1.0–1.2, and the standard deviation of particle size of not more than 0.5 are particularly preferable. The inert particles satisfying these requirements include spherical silica particles, spherical silicone resin particles, spherical crosslinked polystyrene particles, spherical crosslinked acrylic particles, spherical or cubic calcium carbonate particles, calcium phosphate particles and the like.

The average particle size, particle size ratio and standard deviation of the particle size of the inert particles in the aforementioned coating layer can be determined according to, for example, JP-A-1-284534.

The aforementioned coating layer preferably has a resin/particle weight ratio of 30/70-70/30, more preferably 35/65-60/40, particularly preferably 40/60-50/50. When the weight ratio of the resin is less than 30, the particles cannot be sufficiently fixed in the coating layer and may fall off from the coating layer to cause powder fall. Conversely, when the ratio of the resin exceeds 70, sufficient ink adhesion, paper supply property and blocking resistance are difficult to attain.

The coated polyester film of the present invention preferably has a surface resistivity of the coating layer of not more than $1\times10^{13}$ $\Omega/\square$, more preferably not more than $1\times10^{12}$ $\Omega/\square$. When the surface resistivity is greater than $1\times10^{13}$ $\Omega/\square$, electrostatic troubles tend to occur in various steps for preparing this coated polyester film into labels, such as coating of adhesive, printing, sheet cutting, die cutting and the like. To make the surface resistivity fall within the above-mentioned range, for example, an antistatic agent may be added to the above-mentioned adhesion-improving resin composition to be mentioned below, or other method may be employed.

Particularly, the composition constituting the aforementioned coating layer preferably contains an antistatic agent, because it prevents occurrence of electrostatic troubles in various steps for preparing the obtained film into labels, such as coating of adhesive, printing, sheet cutting, die cutting and the like. Examples of the antistatic agent include those generally used as antistatic agent for coating (e.g., quaternary ammonium salt type antistatic agent), particulate carbon black, metal powder (e.g., nickel, copper and the like), metal oxide (e.g., tin oxide, zinc oxide and the like), metal coated fiber (e.g., fibrous brass, stainless, aluminum and the like), conductive filler (e.g., scaly graphite, aluminum flake, copper flake and the like), and conductive polymers (e.g., sulfonated polyaniline, polypyrrole and the like), which can be used where necessary as long as the effect of the present invention is not impaired.

As a method for forming a coating layer, a method comprising applying, as mentioned above, a coating solution, containing an adhesion-improving resin composition containing an adhesion-improving resin and inert particles as main components, to the surface of a polyester film is preferable. In this case, the liquid temperature of the coating solution is preferably 10° C.-20° C., more preferably 12° C.-18° C. The coating solution has a pH of preferably 5.5-7.5, more preferably 6.0-7.0. When the liquid temperature or pH of the coating solution is outside the above-mentioned range, inert particles in the coating solution easily agglomerate, which gives rise to lower productivity due to the clogging of filter in a coating solution circulation system, decreased resistance to falling off of particles from a coating layer and lower time-course stability of the coating solution. It is desirable to filter the coating solution before coating the above-mentioned coating solution, using a filter such as wire-mesh screen, bag type filter, bobbin winder type filter, cartridge type filter and the like, thereby to remove large inert particles that exceed the above-mentioned range of preferable average particle size. The liquid temperature and pH of a coating solution are set within the above-mentioned ranges, and/or the coating solution is filtered using the above-mentioned filter, whereby a coated polyester film having a coating layer surface that shows a 60-degree specular glossiness G1 and a 75-degree specular glossiness G2, both satisfying the above-mentioned formulas (1) and (2), can be easily obtained.

The above-mentioned coating method may be a typical method such as roll coating (e.g., gravure coating, reverse coating, kiss coating, reverse kiss coating and the like), bar coating, air knife method, blade coating, comma coating (roll knife coating), curtain coating, spraying, dipping and the like.

The coating may be applied to the surface of an unoriented polyester film in advance, may be applied to the surface of a monoaxially oriented polyester film, and the film may be further oriented in the direction forming a right angle with the direction of the first orientation, may be applied to the surface of a biaxially oriented polyester film or may be applied in a different manner. Particularly, a method comprising applying the coating to the surface of a monoaxially oriented polyester film and orienting the film in the direction forming a right angle with the direction of the first orientation, thereby to complete crystallization, is most preferable from the aspects of adhesive property, economical benefit, cleanness and the like.

EXAMPLES

The present invention is explained in detail in the following by referring to Examples. The present invention is not limited by these examples. Various properties and capabilities of the films used in the Examples were measured and evaluated by the following methods.

(1) Printability

The surface of a coating layer of a coated polyester film was printed with a UV-curable ink (UVA710 Black, Seiko Advance Co., Ltd.) with Tetoron Screen (#300 mesh), and subjected to UV irradiation at 500 mJ/cm$^2$ to give a print sample. The obtained sample was visually evaluated as follows.

◉: printed part being very clear and easily readable
○: printed part being clear and easily readable
Δ: printed part being somewhat nonuniform
x: printed part being nonuniform (2) Ink adhesive property In the case of an oxidation polymerization (or solvent) type ink, the surface of a coating layer of the coated polyester film is printed with Tetoron Screen (250 mesh), and air dried for one day. In the case of a UV-curable ink, the surface of a coating layer of the coated polyester film is printed with Tetoron Screen (300 mesh) and subjected to UV irradiation at 500 mJ/cm$^2$ to cure the UV-curable ink.

The oxidation polymerization type ink used was obtained by diluting oxidation polymerization type ink (Jujo Kakou, black) with a diluent (Jujo Kako, tetoron®) in a volume ratio of 4:1. The UV-curable ink used was made by Seiko Advance Co., Ltd. (UVA710, Black).

A 2 mm square crosscut surface containing 100 squares was formed on the cured ink layer with a cutter knife. A cellophane tape (Nichiban, CT-24, 25 mm width) was placed thereon while preventing invasion of air bubbles, and sufficient adhesion was secured by rubbing on the tape. Then, both ends of the above-mentioned ink surface where the cellophane tape was not adhered were pressed with hand and the cellophane tape was quickly peeled upward from the crosscut surface (direction forming an angle of 90°).

The ink surface after peeling off was observed, and the ink residual rate (partial peeling off of the square was counted into peeled off squares) with regard to the 100 squares was evaluated according to the following 4 criteria for ink adhesive property, wherein ◉ and ○ were evaluated as acceptable.

◉: residual rate 100% (no peeling off)
○: residual rate not less than 90% and less than 100% (usable without practical problem)
Δ: residual rate not less than 70% and less than 90% (adhesion somewhat weaker, possibly causing practical problem)
x: residual rate not less than 50% and less than 70% (problems in adhesion)

(3) Resistance to falling off of particles from a coating layer

Using a Gakushin-type friction tester (manufactured by Yamaguchi Scientific Industries) with a black paper at a contact part of the load head part and the coated polyester film, the film was reciprocated 10 times while applying a load of 200 gf/25 mm$^2$ (5 mm×5 mm) on the head to allow rubbing with the loaded head part. The black paper after rubbing was visually evaluated as follows.

○: No powder on the black paper
Δ: 1 to 10 particles (not more than 0.5 mm in size) on the black paper
x: not less than 11 or more particles having a size of not more than 0.5 mm or particles greater than 0.5 mm on the black paper (4) Antistatic property A coated polyester film was stood in a 23° C., 65%RH atmosphere for 24 hr, and the surface resistivity (Ω/□) of a surface of a coating layer was measured under the same atmosphere using a high resistivity meter (Hiresta-IP, manufactured by Mitsubishi Petrochemical Co., Ltd.) at an applied voltage of 500 V.

(5) Average particle size of inert particles

According to the method described in JP-A-1-284534 and using a scanning electron microscope and an image analyzer, at least 100 particles were measured for the average particle size ($\mu$m).

(6) Thickness of coating layer

The section of a coated polyester film was photographed with a scanning electron microscope, and the thickness of the coating layer was measured on the photograph. Similar measurement was performed 100 times at different sites and the average of the measures was taken as the thickness ($\mu$m) of the coating layer.

(7) Opacity of polyester film

Using a Macbeth densitometer TR-927, the transmittance of the light through a G filter was measured, and optical density was calculated from the obtained light transmittance and used as an index of opacity. The optical density is expressed as the logarithm ($Log_{10}$) of the reciprocal of the light transmittance (range:0-100%). A greater optical density means higher opacity.

(8) Apparent density of polyester film

A polyester film was precisely cut out in 10 cm×10 cm squares and the thickness at 50 sites was measured and averaged [average thickness t ($\mu$m)]. The sample was weighed in 0.1 mg [W (g)], and the apparent density was calculated from the following formula:

$$\text{apparent density (g/cm}^3\text{)} = (W/t) \times 100$$

(9) Specular glossiness of coating layer surface of coated polyester film

Measured according to the method 2 (75-degree specular glossiness) and method 3 (60-degree specular glossiness) described in JIS-Z8741.

(10) Intrinsic viscosity of polyester resin constituting a polyester film

A polyester resin was dissolved in a mixed solvent of phenol (60 wt %) and 1,1,2,2-tetrachloroethane (40 wt %). The solids were removed through a glass filter and intrinsic viscosity was measured at 30° C.

(11) Void ratio of polyester film

A film was embedded in an epoxy resin and split with a microtome in a direction parallel to the longitudinal drawing direction of the film and perpendicular to the film surface, whereby 5 samples were prepared. At 5 different sites in the same sample, the split section was examined with a scanning electron microscope at appropriate magnifications of 300–3,000, and a photograph clearly showing the distribution of voids in the entire thickness of the film was taken. A straight line perpendicular to the surface of the film was drawn on an optional part of the photographic image, and the voids that crossed the straight line were counted. In addition, the total thickness ($\mu$m) of the film was measured along this straight line, and the number of voids was divided by the thickness to give a void ratio (void/$\mu$m). The measurement was performed at 5 sites per one photograph, and an average of the total 25 sites was calculated to give a void ratio (void/$\mu$m) of the sample.

(12) Temperature of coating solution

The liquid temperature (° C.) of the coating solution was measured with a mercury thermometer.

(13) pH of coating solution

Measured with a pH meter (Horiba, Ltd., ACT D-22).

EXAMPLE 1

A resin composition containing a polyethylene terephthalate resin (80 wt %) having an intrinsic viscosity of 0.62 dl/g, polystyrene (15 wt %) having a melt flow index of 5.5 g/10 min and rutile titanium oxide (5 wt %) having an average particle size of 0.3 $\mu$m was melted at 285° C., and extruded on a drum having a surface temperature of 40° C. The obtained unoriented sheet was drawn 3.5 times in the longitudinal direction at 90° C. to give a monoaxially oriented polyester film.

A coating solution was prepared, which contained a copolymerized polyester resin (3.15 wt %, in solids, Toyo Boseki Kabushiki Kaisha, VYLONAL), a water-soluble urethane resin wherein terminal isocyanate group had been blocked with hydrophilic group (5.85 wt %, in solids, DAI-ICHI KOGYO SEIYAKU CO., LTD., ELASTRON), a quaternary ammonium salt type antistatic agent (6.20 wt % of the aforementioned resin component) and silica particles (12.4 wt %) having an average particle size of 0.45 $\mu$m.

The obtained coating solution was adjusted to pH 6.5 with a pH adjusting solution, then filtered through a bag type filter (SUMITOMO 3M LIMITED, liquid filter bag), and stirred in a coating solution circulating stock tank at 15° C. for 2 hr.

This coating solution was applied to one surface of the monoaxially oriented film obtained above by reverse kiss coating to make the resin solid thickness 0.9 $\mu$m before drawing. The film was drawn 3.5 times in the transverse direction at 120° C. while drying, and heat treated at 230° C. while relaxing by 4% to give a coated polyester film having a coating layer formed on one surface of a 50 $\mu$m thick polyester film having fine voids, which showed an apparent density of 1.10 g/cm$^3$ and a void ratio of 0.31 void/$\mu$m. The properties and evaluation results of the obtained film are shown in Table 1 and Table 2.

EXAMPLE 2

In the same manner as in Example 1 except that, in the coating layer, copolymerized polyester resin was contained in a proportion of 2.5 wt %, water-soluble urethane resin was contained in a proportion of 4.6 wt %, and as the inert particles, silica particles having an average particle size of 0.45 $\mu$m were contained in a proportion of 6.0 wt % and calcium carbonate particles having an average particle size of 0.8 $\mu$m were contained in a proportion of 2.0 wt %, a coated polyester film was obtained. The properties and evaluation results of the obtained film are shown in Table 1 and Table 2.

Comparative Example 1

In the same manner as in Example 1 except that benzoguanamine-formaldehyde condensate particles having an average particle size of 2.0 $\mu$m were contained in a proportion of 9.0 wt % in the coating layer as the inert particles, a coated polyester film was obtained. The properties and evaluation results of the obtained film are shown in Table 1 and Table 2.

Comparative Example 2

In the same manner as in Example 1 except that, in the coating layer, copolymerized polyester resin was contained in a proportion of 9.1 wt %, water-soluble urethane resin was contained in a proportion of 3.9 wt %, and as the inert particles, silica particles having an average particle size of 5.5 $\mu$m were contained in a proportion of 2.9 wt %, silica particles having an average particle size of 2.7 $\mu$m were contained in a proportion of 2.9 wt % and silica particles having an average particle size of 0.15 $\mu$m were contained in a proportion of 7.3 wt %, and the resin solid thickness before drawing was set for 1.8 $\mu$m, a coated polyester film was obtained. The properties and evaluation results of the obtained film are shown in Table 1 and Table 2.

Comparative Example 3

In the same manner as in Example 1 except that the temperature of the coating solution in the stock tank was adjusted to 40° C., a coated polyester film was obtained. The properties and evaluation results of the obtained film are shown in Table 1 and Table 2.

Comparative Example 4

In the same manner as in Example 1 except that the pH of the coating solution was adjusted to 9.5, a coated polyester film was obtained. The properties and evaluation results of the obtained film are shown in Table 1 and Table 2.

TABLE 1

| | G1 | G2 | Opacity (optical density) | Apparent density (g/cm$^3$) | Average particle size ($\mu$m) | Void ratio (void/$\mu$m) |
|---|---|---|---|---|---|---|
| Ex.1 | 8.9 | 32.7 | 0.80 | 1.10 | 0.45 | 0.31 |
| Ex.2 | 16.1 | 22.5 | 0.81 | 1.10 | 0.54 | 0.31 |
| Com.Ex.1 | 14.8 | 7.3 | 0.79 | 1.10 | 2.0 | 0.31 |
| Com.Ex.2 | 6.1 | 2.5 | 0.82 | 1.10 | 1.9 | 0.31 |
| Com.Ex.3 | 12.3 | 10.2 | 0.80 | 1.10 | 0.45 | 0.31 |
| Com.Ex.4 | 15.4 | 12.8 | 0.79 | 1.10 | 0.45 | 0.31 |

TABLE 2

| | Printability | Ink adhesive property | Resistance to falling off of particles from coating layer | Antistatic property (surface resistivity, Ω/□) |
|---|---|---|---|---|
| Ex.1 | ◉ | ◉ | ○ | $3 \times 10^{11}$ |
| Ex.2 | ◉ | ◉ | ○ | $4 \times 10^{11}$ |
| Com.Ex.1 | ○ | ◉ | x | $1 \times 10^{12}$ |
| Com.Ex.2 | ○ | ◉ | x | $2 \times 10^{12}$ |
| Com.Ex.3 | ○ | ◉ | Δ | $5 \times 10^{11}$ |
| Com.Ex.4 | ○ | ◉ | Δ | $7 \times 10^{11}$ |

The coated polyester film of the present invention can improve printability by preventing falling off of particles from a coating layer, while maintaining ink adhesive property. Therefore, it is particularly useful as a substrate for labels.

This application is based on application No. 2000-167896 filed in Japan, the contents of which are incorporated hereinto by reference.

What is claimed is:

1. A coated polyester film comprising a polyester film having opacity as shown by an optical density of not less than 0.3, and a coating layer formed on at least one surface of said polyester film, wherein said coating layer is made from a resin composition comprising an adhesion-improving resin and inert particles having an average particle size of 0.06–1.0 μm and wherein a surface of said coating layer shows a 60-degree specular glossiness G1 and a 75-degree specular glossiness G2 that satisfy the following formulas (1) and (2):

$$G1 \leq 20 \quad (1)$$

$$1 < G2/G1 \leq 4 \quad (2).$$

2. The coated polyester film of claim 1, wherein the polyester film comprises voids and has an apparent density of 0.3–1.3 g/cm$^3$.

3. The coated polyester film of claim 1, wherein said resin composition comprises at least one resin selected from the group consisting of polyester, polyurethane, acrylic polymers and copolymers thereof.

4. The coated polyester film of claim 1, wherein said resin comprises a water-insoluble and water-dispersible polyester resin and a water-soluble polyurethane resin having at least one block isocyanate in a molecule.

5. The coated polyester film of claim 1, wherein a surface of said coating layer has a surface resistivity of not more than $1 \times 10^{13}$ Ω/□.

6. The coated polyester film of claim 1, wherein the polyester film has voids and wherein a ratio of the number of voids to a film thickness is not less than 0.20 void/μm.

* * * * *